United States Patent [19]
Douglas

[11] Patent Number: 5,857,188
[45] Date of Patent: *Jan. 5, 1999

[54] MANAGEMENT OF CLIENT REQUESTS IN A CLIENT-SERVER ENVIRONMENT

[75] Inventor: Jeffrey G. Douglas, San Francisco, Calif.

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 639,496

[22] Filed: Apr. 29, 1996

[51] Int. Cl.⁶ ............................................... G06F 17/30

[52] U.S. Cl. ................................ 707/9; 707/5; 707/10

[58] Field of Search ..................... 395/200.09, 200.47, 395/610–614; 707/9, 5, 10

[56] References Cited

U.S. PATENT DOCUMENTS

| | | | |
|---|---|---|---|
| 5,335,346 | 8/1994 | Fabbio | 711/163 |
| 5,379,383 | 1/1995 | Yunoki | 395/200.33 |
| 5,581,749 | 12/1996 | Hossain et al. | 707/10 |
| 5,594,732 | 1/1997 | Bell et al. | 370/401 |
| 5,611,076 | 3/1997 | Durflinger et al. | 707/102 |
| 5,627,979 | 5/1997 | Chang et al. | 345/335 |
| 5,696,898 | 12/1997 | Baker et al. | 395/187.01 |
| 5,764,977 | 6/1998 | Oulid-Aissa et al. | 707/10 |

*Primary Examiner*—Parshotam S. Lall
*Assistant Examiner*—Kenneth R. Coulter
*Attorney, Agent, or Firm*—Gates & Cooper

[57] ABSTRACT

A method, apparatus, and article of manufacture for monitoring and regulating access to a database. Requests for the database are intercepted and evaluated against one or more restrictions established by a database administrator for the database and generating an indication signal representative of the evaluation. The intercepted requests are rejected or allowed in accordance with the indication signal.

24 Claims, 9 Drawing Sheets

MANAGEMENT OF CLIENT REQUESTS IN A CLIENT-SERVER ENVIRONMENT

BACKGROUND OF THE INVENTION

1. Field of the Invention

The invention relates in general to client-server computer systems, and more particularly, to managing client application requests to database servers in a client-server computer system.

2. Description of Related Art

Computers are increasingly being used in the client-server configuration. In a client-server configuration, multiple computers are interconnected by a communication network, wherein certain computers perform client functions and other computers perform server functions. A client computer generates requests and a server computer processes the client's requests. A particular computer can at times a client and at other times a server.

One application of the client-server architecture is on-line transaction processing. Airline reservation and banking systems are classic examples of on-line transaction processing.

Another application is business information processing. For example, many businesses store information in decision support systems which include large databases containing information on their business, their customers and their competitors. The decision support databases are manipulated and queried for customer profiling, target marketing analysis, etc. Typically, decision support databases store and operate on large amounts of data.

The principal advantages of the client-server architecture include the distribution of work and the sharing of resources. Data, application programs, data storage devices, processing power, printers, communication subsystems, etc., can be shared. The client-server architecture also makes it possible to keep a centralized database, which is shared, as opposed to maintaining multiple copies of the same data, which incurs the overhead of insuring that the data remains consistent at all locations.

With continuing improvements in computer and communications technologies, the client-server architecture is being increasingly utilized. Computers can now be interconnected with local area networks and wide area networks, including wired telephone lines, cellular systems, satellite communication links, etc. The increased speed of communication networks that has been achieved have expanded the practical applications of client-server systems. Furthermore, improvements in distributed servers, in which multiple computers act as servers that individually or together process client requests have increased the applicability of the client-server architecture. For example, a distributed transaction processing system is possible using distributed servers.

Furthermore, recent development of industry standards have made open distributed systems possible. In an open system, various types of computers running under various operating systems can be interconnected to form an open distributed client-server system. Open distributed systems allow application developers to quickly create client-server database applications which can be run without modification against any database in an open distributed system. Open Database Connectivity (ODBC), available from Microsoft® Corporation, is a standard database access application programming interface (API) which makes open distributed systems possible.

Once significant cost associated with the client-server architecture is the cost of processing client requests on a database server. In client-server systems, a client generates a request which may include a login request, a query request, etc. The request is transmitted to a server via a communication network that interconnects the client and server computers. The server processes the request and transmits a response message to the client. Some of the query requests may be quite complex, and the response message may contain very large data sets.

The costs associated with processing client requests include communication network time (e.g., satellite, telephone line, and/or cellular communication links) and database server time. These costs are particularly acute in open systems where the ease of application development, combined with users nearly unrestricted ability to submit complex queries, often creates situations where sever resources are saturated due to processing large numbers of queries and networks are saturated due to communicating of large data sets. Furthermore, as more clients are simultaneously connected to a server system, the bandwidth of the communication network must be increased to accommodate the many clients.

Thus, in the client-server industry, there is an intensely felt need for managing client requests of database servers while still providing the advantages of open distributed system architecture.

SUMMARY OF THE INVENTION

To overcome the limitations in the prior art described above, and to overcome other limitations that will become apparent upon reading and understanding the present specification, the present invention discloses a method, apparatus, and article of manufacture for monitoring and regulating access to a database. Requests for the database are intercepted and evaluated against one or more restrictions established by a database administrator for the database and generating an indication signal representative of the evaluation. The intercepted requests are rejected or allowed in accordance with the indication signal.

As will be appreciated from the foregoing brief summary of the invention, one object of the present invention is to manage the requests of a database in a client-server environment. Another object of the present invention is to provide a data base query manager that maintains the advantages of an open client-server system environment. Still another object of the present invention is to manage access to databases using various types of restrictions. Further objects of the invention will become apparent upon reading and understanding the present specification.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiments, reference is made to the accompanying drawings which form a part hereof, and in which is shown by way of illustration specific embodiments in which the invention may be practiced. It is to be understood that other embodiments may be utilized as structural changes may be made without departing from the scope of the present invention.

Figure 1:
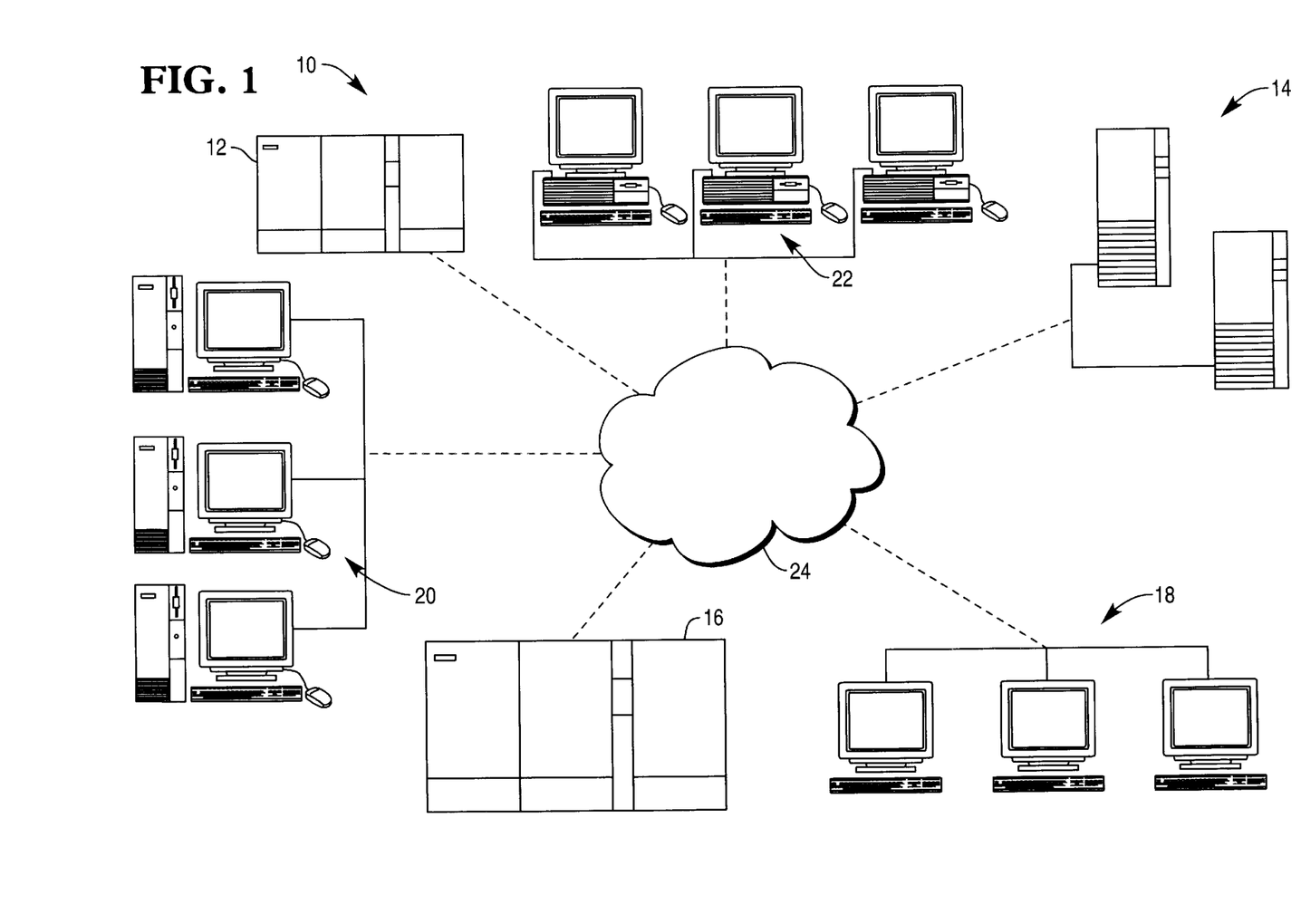
FIG. 1 is a pictorial diagram of a client-server system in accordance with the present invention.

FIG. 1 is a pictorial diagram of a client-server system 10 in accordance with the present invention. The client-server system 10 includes: servers 12, 14 and 16; clients 18, 20 and 22; and a communication network(s) 24 which interconnects the servers and the clients. The clients illustrated are work stations 20, personal computers 22, and terminals 18. Other clients, for example, laptop computers and personal digital assistants, are also possible. The servers are illustrated as mainframe and mini computers, however, other computers, including smaller computers, could also take the role of a server. Communication network 24 can be comprised of many types of communication networks, including local area networks and wide area networks, such as wired telephone lines, a cellular telephone network and a satellite link. Communication network 24 could be made up of multiple networks of different types.

In the client-server system, clients 18, 20, 22 generate requests that are processed by servers 12, 14, 16. The requests are transmitted from a client 18, 20, 22 to a server 12, 14, 16 via communication network 24. Servers 12, 14, 16 process the request and a response message is sent back over communication network 24 to the client that made the request. For example, one of the personal computers 22 can send a request to server 16 over communication network 24. In prior art client-server systems, the server processes the client request without regard to the user or the complexity of the request. The costs associated with request processing can be significant, as described above.

Servers 12, 14, 16 can work individually, each as a separate server. In that case, clients 18, 20, 22 would connect to one of the servers 12, 14, 16, and any client requests would be sent to and processed by that server. Alternatively, servers 12, 14, 16 can work together to form a server system, which appears as a single server to the clients. A client request can be processed wholly by one of the servers 12, 14, 16, or the request can be subdivided so that parts of the request are processed by different ones of the servers 12, 14, 16. In this case, the server system is a distributed server. For example, the distributed server may be implemented using TOP END® software available from NCR Corporation, the assignee of the present invention.

Figure 2:
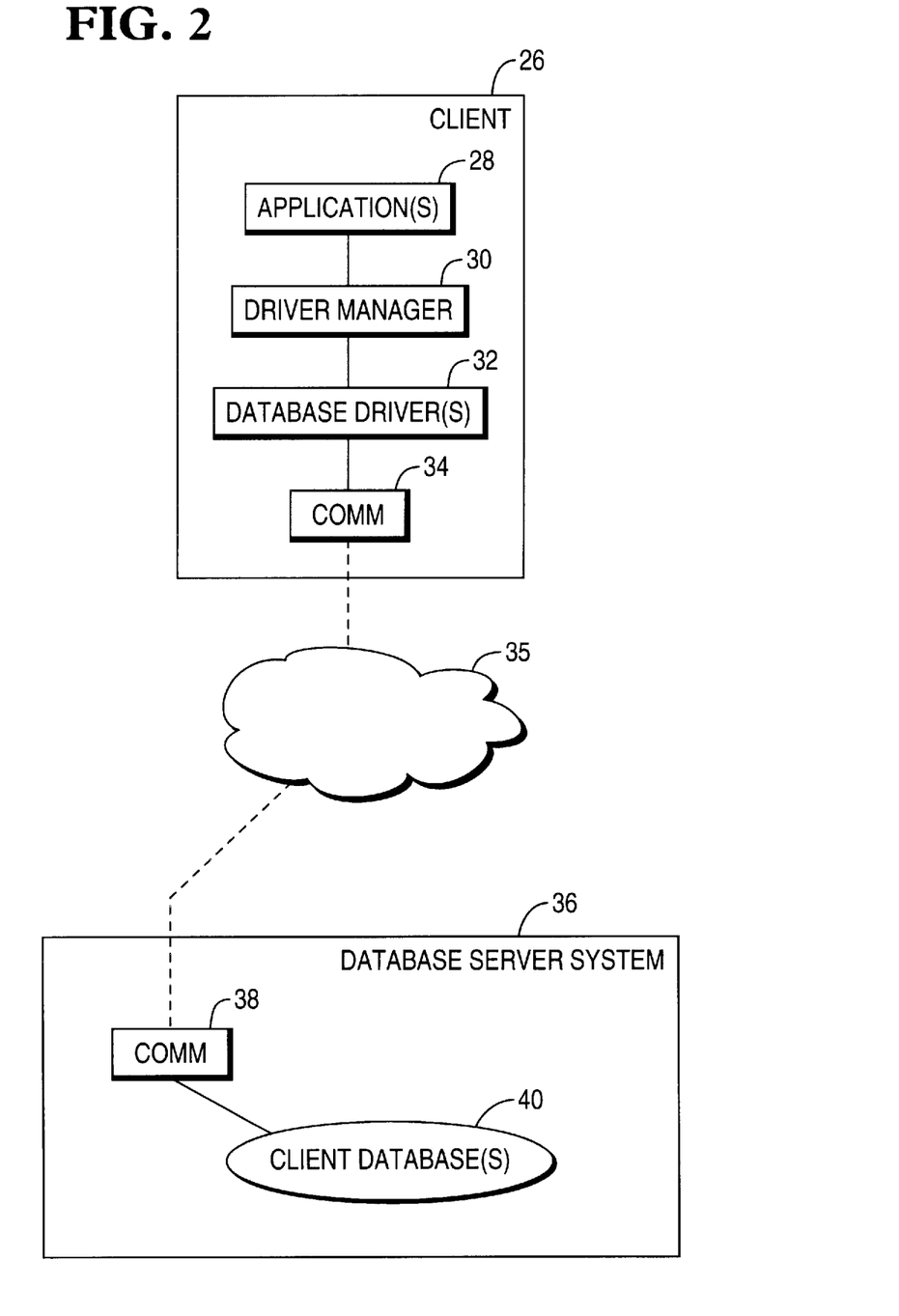
FIG. 2 is a pictorial diagram of a client-server system including software components in accordance with the present invention.

FIG. 2 is a pictorial diagram of a client-server system including software components in accordance with the present invention. The client 26 and server 36 are interconnected by a communication network(s) 35. The server 36 may comprise a database server and thus includes a number of databases 40.

Software components present on client 26 include applications and middleware. Client applications 28 make requests of databases 40 by way of the middleware. Requests typically comprise logical connection (login) requests, query requests, etc., and may initiate physical connection requests.

A physical connection request is a request for a network connection between the client 26 and server 36. Each physical connection may support one or more logical connections initiated from client applications 28. Client applications 28 may each open one or more logical connections. Moreover, logical connections may be multiplexed over different physical connections.

Where multiple database drivers 32 reside on client 26, a client application 28 request may include a data source identifier, which identifies a particular database. Databases 40 may include data stored on storage devices such as hard drives. Example databases include Teradata, DB2, Sybase, Oracle, etc.

The middleware includes a driver manager 30 and database drivers 32. Driver manager 30 provides an interface between client applications 28 and database drivers 32 by receiving client application 28 requests and passing these requests to database drivers 32. Database drivers 32 may be vendor-specific drivers which interface with databases 40 for executing client application 28 requests. To allow client applications 28 to access differing databases 40, the driver manager 30 is an open, vendor-independent interface, and preferably comprises the Open Database Connectivity (ODBC) driver manager provided by Microsoft® with Microsoft's ODBC Desktop Database Driver Pack.

Communications components 34 and 38, which generally include hardware along with supporting firmware and/or software, are included on client 26 and server 36 to provide an interface with communications network 35. For example, the communication hardware could include modems, network cards, etc.

Figure 3:
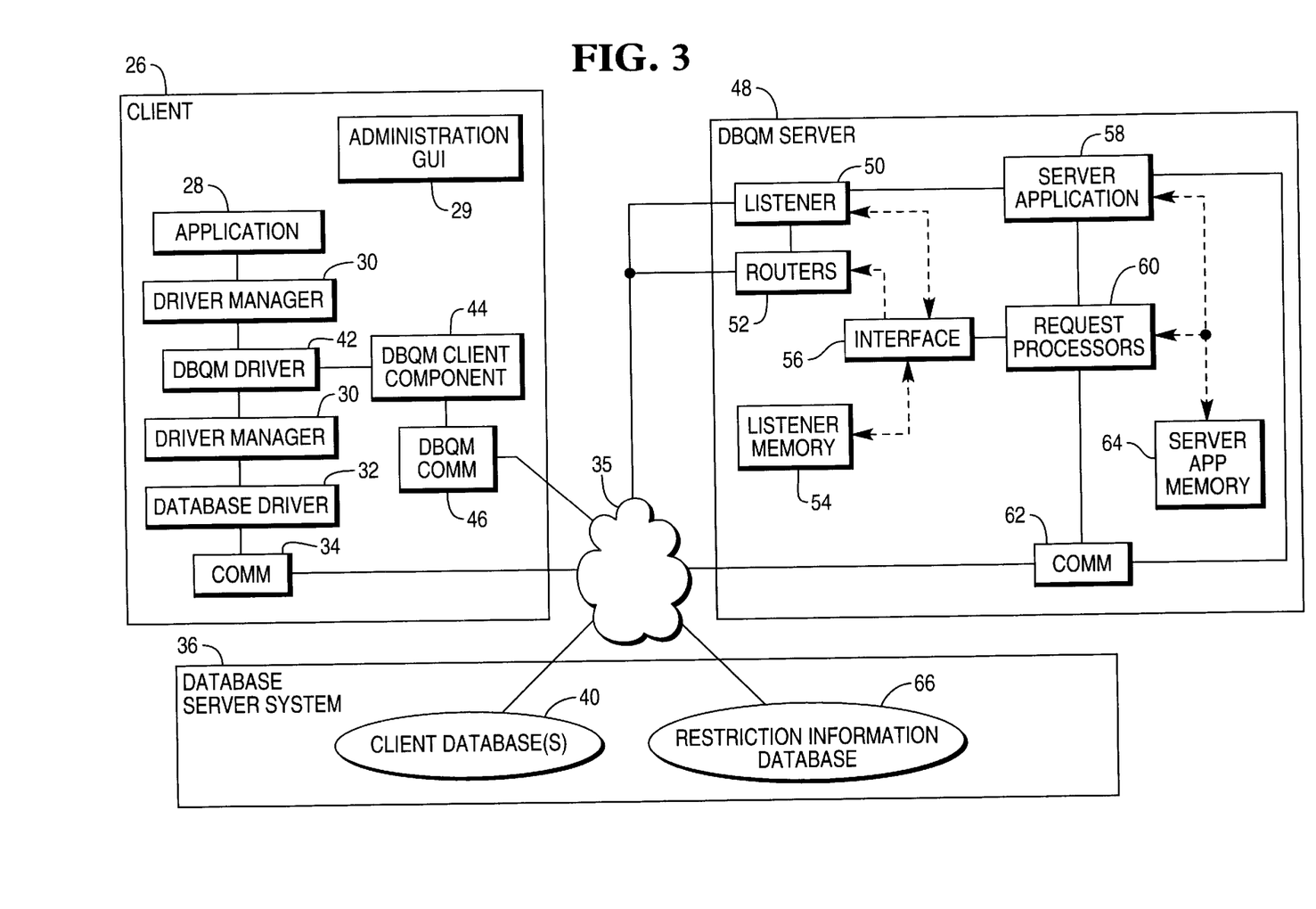
FIG. 3 is a pictorial diagram of the software components on a client system and a database query management (DBQM) server in one embodiment of the present invention.

FIG. 3 is a pictorial diagram of the software components on a client system 26 and a database query management (DBQM) server 48 in one embodiment of the present invention. According to the invention, client 26 is provided with a DBQM ODBC driver 42, DBQM component 44, and DBQM communications component 46, each of which may comprise a dynamic link library (DLL). DBQM ODBC driver 42 intercepts client application 28 requests, such as logical connection requests and query requests, transmitted to database driver 32 from driver manager 30. Each intercepted request is packaged within a request message and is communicated to DBQM server 48, via DBQM client component 44, and DBQM communications component 46. The intercepted request is evaluated by the DBQM server 48 to determine if the client application 28 request should receive access to a database 40. Thereafter, the DBQM server 48 returns its evaluation regarding the request.

The evaluation is communicated as an indication signal to the DBQM ODEC driver 42 and the indication signal is interpreted as either allowing or denying access. If access is allowed, DBQM ODBC driver 42 passes the client application 28 request along with a database identifier to driver manager 30, which then communicates the request to the appropriate database driver 32. If access is denied, the request may be deferred and/or an error message may be returned to the client application 28.

DBQM ODBC driver 42 thus both receives client application 28 requests from driver manager 30 and communicates client application 28 requests to driver manager 30. In effect, DBQM ODBC driver 42 is layered between driver managers 30, as shown in FIG. 3. By layering DBQM ODBC driver 42 between driver managers 30, few, if any, modifications to client applications 28 or database drivers 32 will be needed since both client applications 28 and database drivers 32 interface directly with driver manager 30, for which they were designed.

DBQM server 48 receives request messages from DBQM ODBC driver 42, processes each request message, and returns a result indicative of whether the request may access a particular database 40. Access may be managed based on objects in the request, such as user identification, databases, tables and rows, and macros. Access also may be managed based on system resources criteria, such as central processing unit utilization, disk utilization, network activity. Further, access may be managed based on estimates of the costs involved with the queries.

For processing request messages, DBQM server 48 includes a listener process 50 which generates router processes 52 for receiving the request messages from DBQM communications component 46. Routers 52 store the request messages in a listener memory 54. DBQM server 48 also includes a server application 58 which generates request processors 60 to retrieve request messages from listener memory 54 and compare them against restriction information to determine a result. The restriction information is stored in a server application memory 64. Both server application 54 and request processors 60 access a restriction information database 66 via communications component 62 to retrieve restriction information.

The restriction information may include both user-specific restriction information and global restriction information. User-specific restriction may include information such as which databases a user may access or which times a user may access a particular database. Global threshold information may include system threshold value information, such as the number of users or logins allowed on a database, and query threshold values, such as maximum data set size, query processing time, etc.

Client 26 may also include an administration application 29, for example, a graphical user interface (GUI), through which a database administrator can set and update the restriction information.

Figure 4:
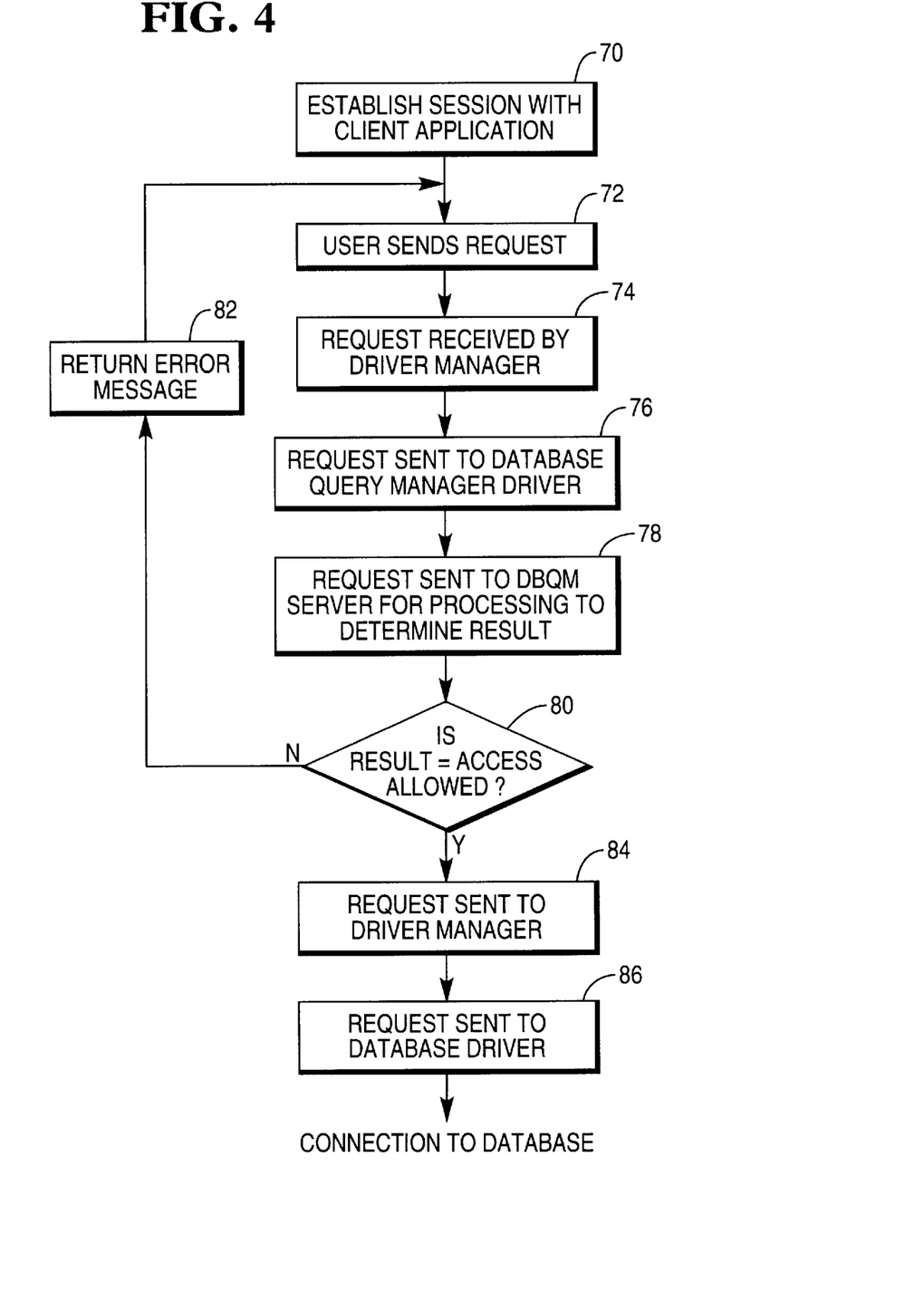
FIG. 4 is a flow chart illustrating steps performed by a client in making a request of a database server in accordance with the present invention.
Figure 5:
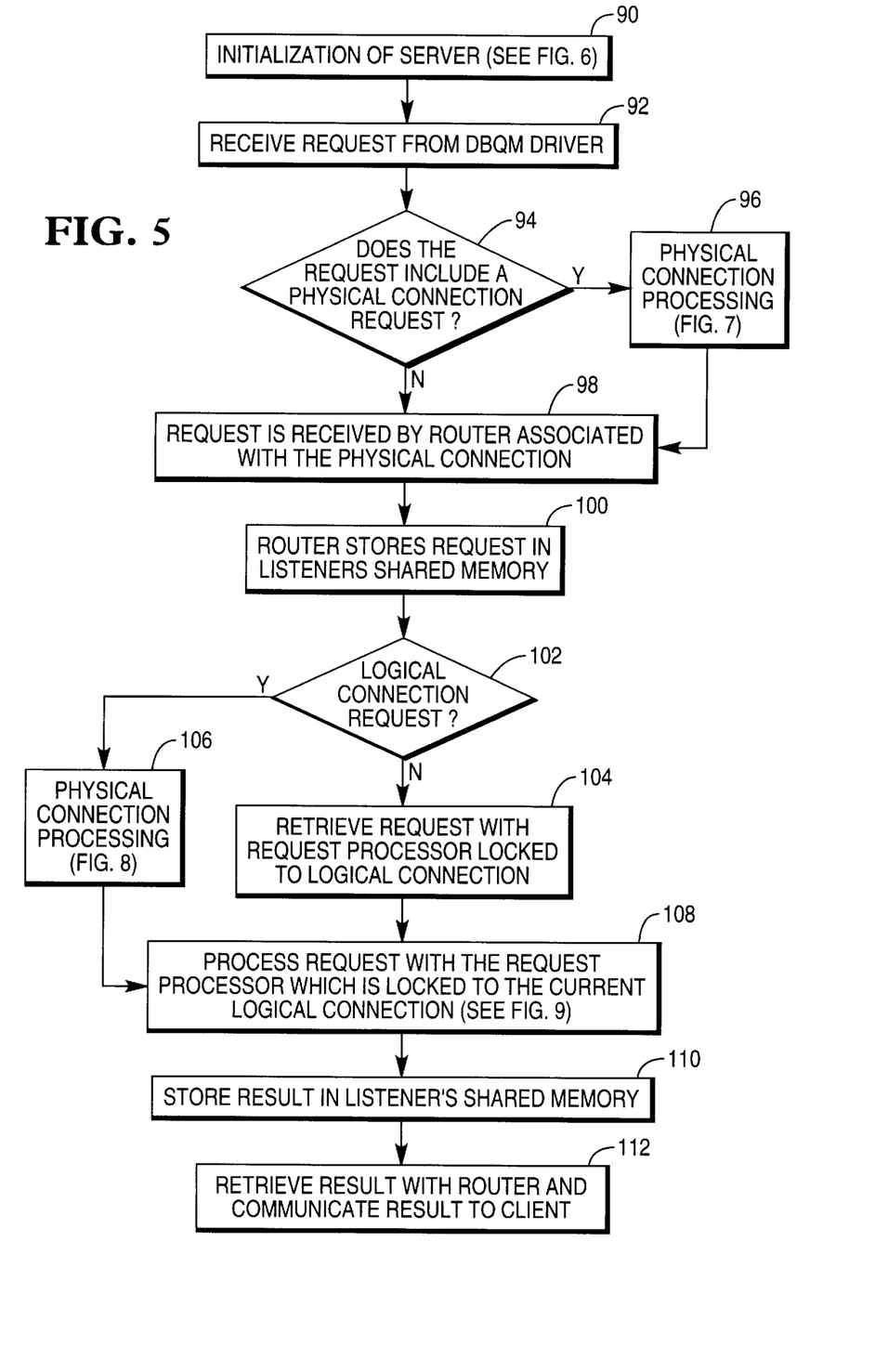
FIG. 5 is a flow chart illustrating steps performed by a database management server in accordance with the present invention.

The steps performed by client 26 and DBQM server 48 in providing database access management of client application 28 requests in accordance with one embodiment of the invention are described with reference to FIGS. 4–9. FIG. 4 illustrates the steps performed on client 26. FIG. 5 illustrates the steps performed on DBQM server 48. FIGS. 6–9 illustrate in further detail the initialization, physical connection processing, logical connection processing, and request processing, and initialization steps performed on DBQM server 48.

FIG. 4 is a flow chart illustrating steps performed by a client in making a request of a database server in accordance with the present invention. On the client side, a user establishes a session with a client application 28, as indicated in block 70. Next, the client application 28 sends a request to be processed on a database server 40, as indicated in block 72. The request is received by driver manager 30 and communicated to DBQM ODBC driver 42 rather than to a database driver 32, as indicated in blocks 74 and 76. DBQM ODBC driver 42 packages the request along with additional information, such as the VoteStruct object, into a message and sends the request message to DBQM server 40, via DBQM client component 44 and DBQM communications component 46, as indicated in block 78. Where the request message includes a physical connection request, a communication link is formed between client 26 and DBQM server 48, over communication network 35. DBQM server 48 processes the request message to determine a result indicative of whether the client application 28 request may access the database 40, as will be described more fully below with reference to FIGS. 5–9. The result is returned to DBQM ODBC driver 42 via a "VoteStruct" object of the request message. DBQM ODBC driver 42 either passes the client application 28 request along with an identified ODBC data source to the driver manager 30 or returns an error message to client application 28 and waits for the client application 28 to generate another request, as indicated by decision block 80, and blocks 72, 82, and 84. The request sent at block 84 is passed from driver manager 30 to the identified database driver 32, as indicated in block 86. This step includes receiving a handle from the database driver 32 and mapping the connection identifier returned by DBQM client component 44 to the handle. Database driver 32 then executes the client application 28 request on a database 40.

FIG. 5 is a flow chart illustrating steps performed by a database management server in accordance with the present invention. DBQM server 48 is initialized as indicated at block 90. Initialization includes generating request processors 60. Following initialization, DBQM server 48 is ready to receive a request message for processing, as indicated at block 92. If the incoming request message includes a physical connection request, DBQM server 48 process the physical connection request, as indicated by decision block 94 and block 96. Request processing includes associating a router with the physical connection. Following physical connection processing block 96, or if no physical connection is requested, the request message is received by the router 52 associated with the physical connection on which the request message was received, as indicated by decision block 94 and block 98. Router 52 then stores the request message in a queue in listener shared memory 54, as indicated at block 100. If the request message includes a new logical connection request, DBQM server 48 process the logical connection request as indicated by decision block 102 and block 106. This includes retrieving the request message from the queue with an available request processor 60 and locking the request processor 60 to the logical connection. It should be understood that, in this context, the logical connection request is a request to login or logically connect to a particular database. In addition, it is noted that an available request processor 60 is one which has no active logical connections or which has logical connections that have been inactive for a period of time. Thus, a request processor 60 may handle more than one logical connection. However, each logical connection is associated with only one request processor 60 in order that requests received in sequence are responded to in sequence. If the request message does not include a logical connection request, then the request message is received on an existing logical connection. That is, the request processor 60 locked to the existing logical connection retrieves the request message from the queue in shared memory 54, as indicated by decision block 102 and block 104. Locked request processor 60 then processes the request message to determine a result indicative of whether the client application 28 request may access the identified database 40, as indicated at block 108. Following request processing, locked request processor 60 stores the result in listeners' shared memory 54, as indicated at block 110. This involves packaging the result in the VoteStruct object of the request message, updating vote and status fields in the request message, and marking the request message as processed. Finally, as indicated at block 112, the result is retrieved by the associated router 52 and communicated to DBQM ODBC driver 42. This involves retrieving request messages marked processed and communicating such request messages to DBQM communications component 46.

Figure 6:
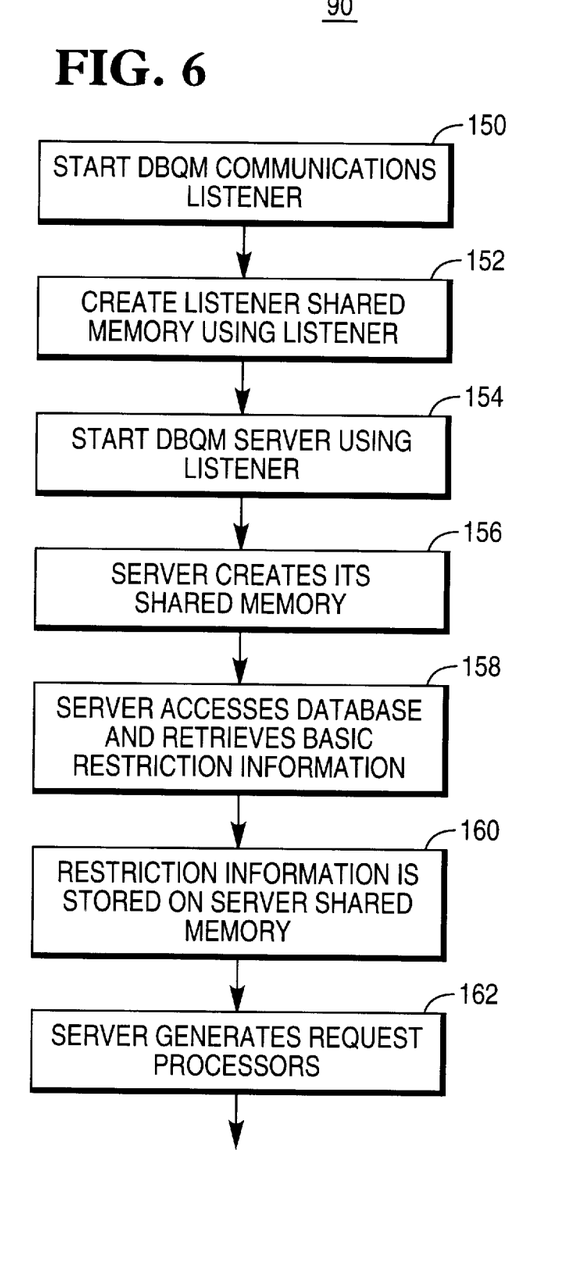
FIG. 6 is a flow chart illustrating physical connection processing steps performed by the database management server in accordance with the present invention.

FIG. 6 is a flow chart illustrating physical connection processing steps performed by the database management server at block 96 in accordance with the present invention. First, after DBQM listener 50 receives a physical connection request, it generates a router 52 and associates router 52 with the physical connection for receiving the incoming request message and ensuing request messages on the physical connection, as indicated by block 114. It is noted that a physical connection request may be either a request to establish a new physical connection, or a request to reestablish a terminated physical connection which had active logical connections. A physical connection may be terminated due to inactivity using a time-out feature which will be described hereinbelow. If the request is to reestablish a terminated physical connection, the router 52 updates the state of the existing logical connections which were on the terminated physical connection, as indicated by decision block 116 and block 118.

Figure 7:
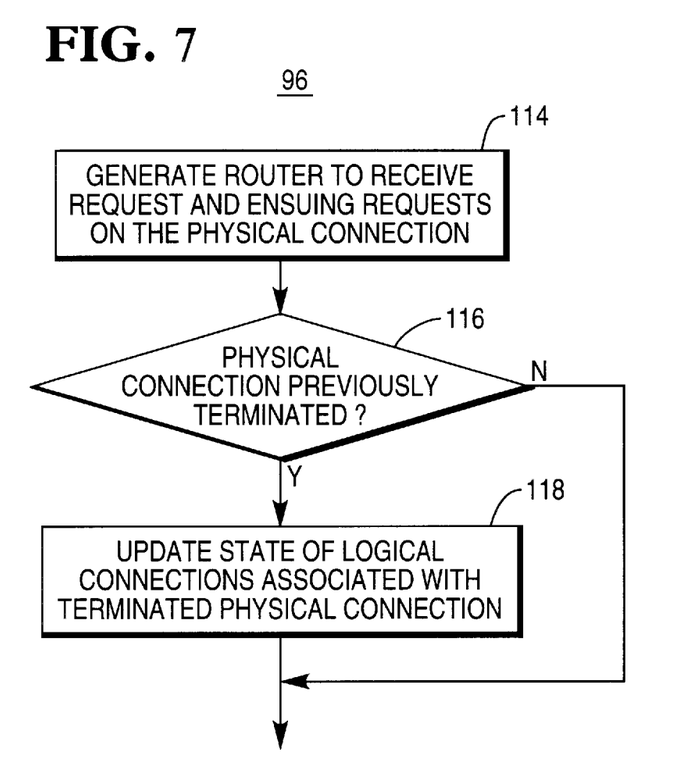
FIG. 7 is a flow chart illustrating logical connection processing steps performed by the database management server in accordance with the present invention.

FIG. 7 is a flow chart illustrating logical connection processing steps performed by the database management server at block 106 in accordance with the present invention. First, at block 120, router 52 associated with the physical connection creates a new logical connection between client 26 and DBQM server 48. An available request processor 60 then retrieves the request message and locks itself to the new logical connection, as indicated in blocks 121 and 122. Next, locked request processor 60 creates a new entry in a context table, and stores therein the user id and databases associated with the new logical connection request, as indicated in block 123. The context table is a table, stored in listener memory 64, which includes the user and databases associated with each active logical connection. This step may include using locked processor 60 to determine the default database associated with the user. Determination of a default database may be done by accessing a table of default databases. Request processors 60 may access the context table to process request messages. For example, when a request processor 60 retrieves a request message on a different logical connection than the one on which it just completed processing a request, the request processor 60 accesses the context table to determine the user and databases associated with the different logical connection. Locked request processor 60 then accesses restriction information database 62 via communications component 66 and retrieves user-specific restriction information, such as database restrictions, time restrictions, group restrictions, etc., as indicated at block 124. Locked request processor 60 then stores the user-specific restriction information in listener shared memory 54, as indicated at block 126. Following logical connection processing, the request message is processed at block 108.

Figure 8:
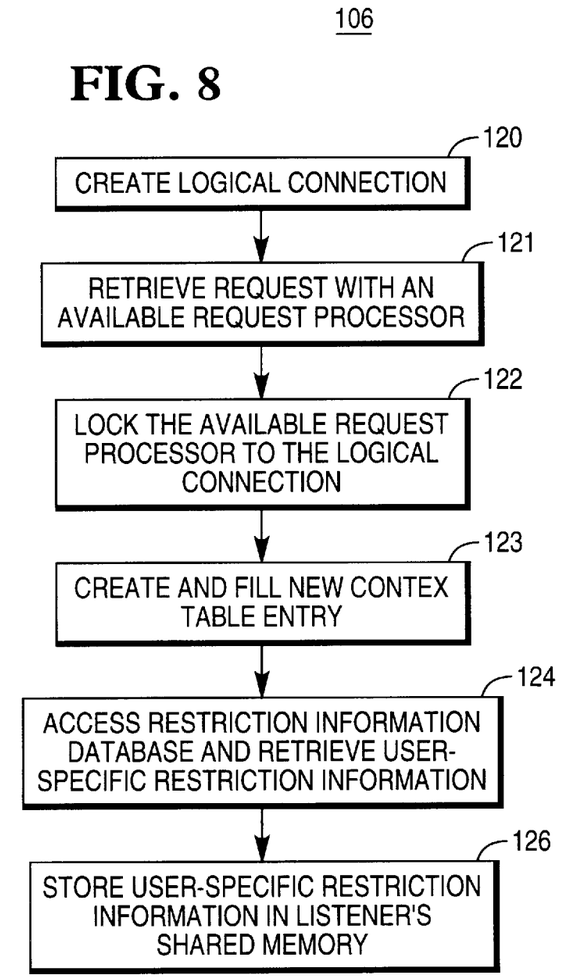
FIG. 8 is a flow chart illustrating request processing steps performed by the database management server in accordance with the present invention.

FIG. 8 is a flow chart illustrating request processing steps performed by the database management server at block 108 in accordance with the present invention. The first step of request processing involves retrieving restriction information, including user-specific and global restriction information from server shared memory 64 using the locked request processor 60, as indicated at block 128. Next, the current system conditions are retrieved and checked against system threshold values as indicated at block 130. The current system conditions may be determined by server application 58, stored in stored memory 64, and subsequently retrieved by a request processor 60. The current system load conditions, as well as restriction information, may be updated periodically, for example, at predetermined time intervals or when signaled by the administrator 29. If the system threshold check fails, i.e., any current system condition exceeds a system threshold, then locked request processor 60 returns an access-denied result, as indicated by decision block 132 and block 140. If the system threshold check passes, locked request processor 60 parses the objects of the request message and, if included, the query statement, as follows. Locked request processor 60 first checks the objects, such as the user id, database, etc., involved in the request message against any restriction information related to the objects, as indicated at block 134. If the object check fails, then request processor returns an access-denied result, as indicated by decision block 136 and block 140. If the object check passes, then locked request processor 60 determines if the request includes a query request, as indicated by decision block 138. If no query is submitted, locked request processor 60 returns an access-allowed result, as indicated by decision block 138 and block 148. If a query is submitted, then request processor 60 performs an analysis of the query. Query analysis involves estimating query result variables, for example, query processing time, answer set size, spool requirements, etc., as indicated at block 142, followed by checking the query result variables against query threshold values, as indicated at block 144. If the query result variables check fails, then locked request processor 60 returns a access-denied result, as indicated by decision block 146 and block 140. Otherwise, if all of the checks pass, an access allowed result is returned as indicated at block 148.

Figure 9:
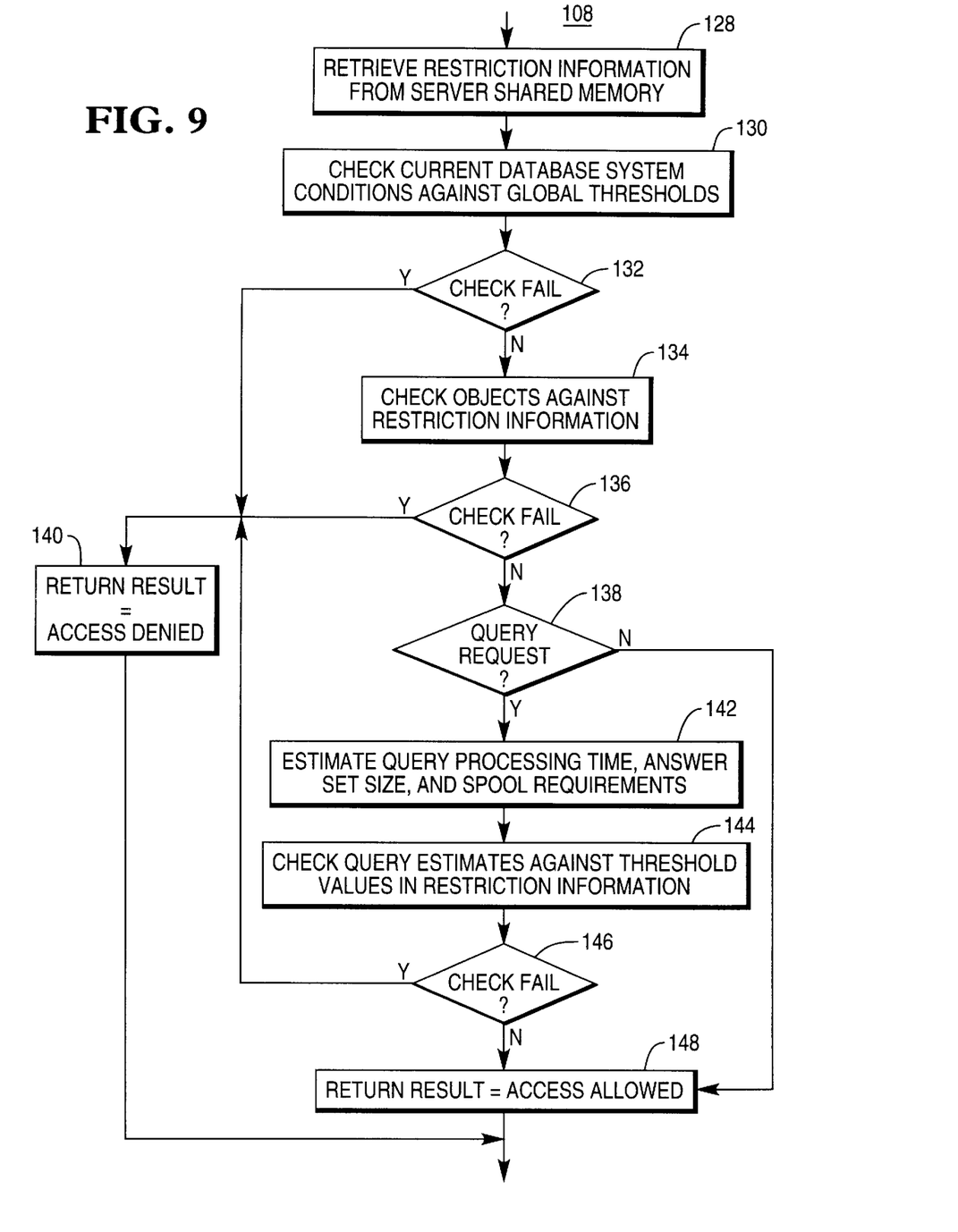
FIG. 9 is a flow chart illustrating initialization steps performed by the database management server in accordance with the present invention.

FIG. 9 is a flow chart illustrating initialization steps performed by the database management server at block 90 in accordance with the present invention. First, DBQM communications listener 50 is started, as indicated at block 150. DBQM listener then creates its shared memory 54, as indicated at block 152. Next, DBQM listener starts server application 58, as indicated at block 154, and provides server application 58 with a shared memory 54 identifier. Server application 58 then creates its shared memory 64, as indicated at block 156. As indicated at block 162, server application 58 also generates a number of request processors 60, which begin searching for client application 28 requests to process. Shared memory 64 is initialized by performing the steps indicated at blocks 158 and 160. At block 158, server application 58 accesses restriction information database 66 and retrieves global restriction information, such as system threshold values and query threshold values. As indicated by block 160, the restriction information is stored in the server shared memory 64.

Further details of the invention will now be described. In one embodiment, client 26 includes a shared memory for general use by the client's components, such as DBQM client component 44 and DBQM communications component 46. DBQM client component 44 uses the shared memory to store and retrieve data structures for tracking outstanding request messages and maintaining request messages once returned with an evaluation or vote. Returned request messages may be stored in a queue in the shared memory.

DBQM client component 44 may also store particular restriction information, for example, known bypass user identifications, in the shared memory. This restriction information may be checked against the request message by client component 44 prior to sending the request message to DBQM server 48 in order to reduce the number of request messages communicated over communications network 35.

DBQM client component 44 may further include a time-out feature, as noted above. With this feature, DBQM client component 44 may disconnect a physical connection with DBQM server 48 which has been inactive over a predetermined period of time thereby freeing the socket for use by other clients 26. This also terminates the router 52 associated with the terminated physical connection. When DBQM ODBC driver 42 subsequently attempts to send a request message over the terminated physical connection, the physical connection is reestablished, a router 52 is created, and the request message processed. The new router 52, rather than creating a new logical connection, merely updates the state of the preexisting logical connections, that is, those logical connections which were inactive, but still connected, on the terminated physical connection.

With regard to server initialization, where DBQM server 48 resides on multiple servers, initialization of each server is accomplished by performing the same steps outlined in FIG. 9. No direct communication or synchronization between the DBQM servers is required for initialization, provided that once a logical connection is established on a particular physical connection, it conducts its entire transaction, from connect to query to disconnect, over the physical connection.

Further details of the request messages will now be described. Request messages have a general format which includes a header, which identifies the nature of the request, a VoteStruct object, and a buffer pointer, which points to a data buffer object. Data buffer objects may be prepared by DBQM client component 44 and used to provide additional information to DBQM server 48. For example, user ids, database ids, and other objects, as well as structured query language (SQL) statements may be sent to DBQM server 48 through data buffers. Data buffer objects include three fields: a text buffer, a length value, and a data tag. The text buffer includes variable length information pertaining to the request message, such as the text of a SQL request, object identifiers, etc. The data tag provides information as to the contents of the data buffer. The objects involved in the request message may be placed in front of the text buffer for easing parsing.

The foregoing description of the exemplary embodiments of the invention has been presented for the purposes of illustration and description. It is not intended to be exhaustive or to limit the invention to the precise form disclosed. Many modifications and variations are possible in like of the above teaching. It is intended that the scope of the invention be limited not with this detailed description, but rather by the claims appended hereto.

What is claimed is:

1. A computer-implemented method of monitoring and regulating access to a database, comprising the steps of:
   (a) transparently intercepting requests to access the database that are transmitted from a device manager to a device driver that processes requests to access the database;
   (b) transmitting the intercepted requests to a server that determines whether the intercepted requests can access the database;
   (c) at the server:
      i) receiving the intercepted requests;
      ii) retrieving the restrictions from a restriction information database;
      iii) evaluating the restrictions against the intercepted requests to produce an indication signal representative of the evaluation; and
      iv) returning the indication signal;
   (d) allowing the intercepted requests in accordance with the indication signal received from the server; and
   (e) transmitting allowed intercepted requests to the device manager for processing.

2. The method of claim 1, wherein the requests conform to an Open Database Connectivity (ODBC) interface.

3. The method of claim 1, wherein the device manager is an Open Database Connectivity (ODBC) driver program.

4. The method of claim 3, further comprising the step of receiving results from the intercepted requests from the Open Database Connectivity (ODBC) driver program.

5. The method of claim 1, further comprising the step of preempting the intercepted requests in accordance with the indication signal.

6. The method of claim 5, wherein the preempting step further comprises the step of interacting with an operator subsequent to the preemption of the intercepted requests.

7. The method of claim 1, wherein the transparently intercepting step comprises the step of intercepting requests generated by an Open Database Connectivity (ODBC) application.

8. The method of claim 1, wherein the device manager is an ODBC Driver Manager, wherein the transparently intercepting step comprises the step of receiving requests transmitted from the ODBC Driver Manager, and wherein the requests are originated from an ODBC application.

9. A system for monitoring and regulating access to a database, comprising:
   (a) a computer;
   (b) means, performed by the computer, for transparently intercepting requests to access the database that are transmitted from a device manager to a device driver that processes requests to access the database and for transmitting the intercepted requests to a server that determines whether the intercepted requests can access the database;
   (c) means, performed by the server, for:
      i) receiving the intercepted requests;
      ii) retrieving the restrictions from a restriction information database;
      iii) evaluating the restrictions against the intercepted requests to produce an indication signal representative of the evaluation; and
      iv) returning the indication signal to the computer;
   (d) means, performed by the computer, for allowing the intercepted requests in accordance with the indication signal received from the server; and
   (e) means, performed by the computer, for transmitting allowed intercepted requests to the device manager for processing.

10. The apparatus of claim 9, wherein the requests conform to an Open Database Connectivity (ODBC) interface.

11. The apparatus of claim 9, wherein the device manager is an Open Database Connectivity (ODBC) driver program.

12. The apparatus of claim 11, further comprising the means for receiving results from the intercepted requests from the Open Database Connectivity (ODBC) driver program.

13. The apparatus of claim 9, further comprising the means for preempting the intercepted requests in accordance with the indication signal.

14. The apparatus of claim 13, wherein the means for preempting further comprises the means for interacting with an operator subsequent to the preemption of the intercepted requests.

15. The apparatus of claim 9, wherein the transparently intercepting means comprises the means for intercepting requests generated by an Open Database Connectivity (ODBC) application.

16. The apparatus of claim 9, wherein the device manager is an ODBC Driver Manager, wherein the transparently intercepting means comprises the means for receiving requests transmitted from the ODBC Driver Manager, and wherein the requests are originated from an ODBC application.

17. A program storage medium readable by a computer having a memory, the medium tangibly embodying one or more programs of instructions executable by the computer to perform method steps for monitoring and regulating access to a database, the method comprising the steps of:
  (a) transparently intercepting requests to access the database that are transmitted from a device manager to a device driver that processes requests to access the database;
  (b) transmitting the intercepted requests to a server that determines whether the intercepted requests can access the database;
  (c) at the server:
    i) receiving the intercepted requests;
    ii) retrieving the restrictions from a restriction information database;
    iii) evaluating the restrictions against the intercepted requests to produce an indication signal representative of the evaluation; and
    iv) returning the indication signal to the computer;
  (d) allowing the intercepted requests in accordance with the indication signal received from the server; and
  (e) transmitting allowed intercepted requests to the device manager for processing.

18. The method of claim 17, wherein the requests conform to an Open Database Connectivity (ODBC) interface.

19. The method of claim 17, wherein the device manager is an Open Database Connectivity (ODBC) driver program.

20. The method of claim 19, further comprising the step of receiving results from the intercepted requests from the Open Database Connectivity (ODBC) driver program.

21. The method of claim 17, further comprising the step of preempting the intercepted requests in accordance with the indication signal.

22. The method of claim 21, wherein the preempting step further comprises the step of interacting with an operator subsequent to the preemption of the intercepted requests.

23. The method of claim 17, wherein the transparently intercepting step comprises the step of intercepting requests generated by an Open Database Connectivity (ODBC) application.

24. The method of claim 17, wherein the device manager is an ODBC Driver Manager, wherein the transparently intercepting step comprises the step of receiving requests transmitted from the ODBC Driver Manager, and wherein the requests are originated from an ODBC application.

* * * * *